(12) United States Patent
Leonard

(10) Patent No.: US 8,622,158 B2
(45) Date of Patent: Jan. 7, 2014

(54) MODULAR TRANSPORT APPARATUS

(76) Inventor: Michael Leonard, Hagerstown, MD (US)

(*) Notice: Subject to any disclaimer, the term of this patent is extended or adjusted under 35 U.S.C. 154(b) by 0 days.

(21) Appl. No.: 13/265,324

(22) PCT Filed: Apr. 26, 2010

(86) PCT No.: PCT/US2010/032430
§ 371 (c)(1),
(2), (4) Date: Oct. 19, 2011

(87) PCT Pub. No.: WO2010/124287
PCT Pub. Date: Oct. 28, 2010

(65) Prior Publication Data
US 2012/0034055 A1 Feb. 9, 2012

Related U.S. Application Data

(60) Provisional application No. 61/172,520, filed on Apr. 24, 2009.

(51) Int. Cl.
*B62D 1/02* (2006.01)
*B60P 1/02* (2006.01)

(52) U.S. Cl.
USPC .................................. 180/9.1; 180/7.1

(58) Field of Classification Search
USPC ...................... 180/7.1, 9, 9.1, 9.21
See application file for complete search history.

(56) References Cited

U.S. PATENT DOCUMENTS

| | | | | |
|---|---|---|---|---|
| 3,891,108 A * | 6/1975 | Traficant | | 254/45 |
| 4,114,854 A * | 9/1978 | Clark | | 254/122 |
| 5,299,906 A * | 4/1994 | Stone | | 187/275 |
| 6,729,833 B2 * | 5/2004 | Cichon et al. | | 414/745.3 |
| 7,179,040 B2 * | 2/2007 | Masuda et al. | | 414/462 |
| 7,438,301 B2 * | 10/2008 | Schilling et al. | | 280/79.7 |
| 2003/0221878 A1 * | 12/2003 | Park | | 180/7.1 |
| 2004/0200645 A1 * | 10/2004 | Koors et al. | | 180/7.1 |
| 2012/0020762 A1 * | 1/2012 | Roose | | 414/495 |

FOREIGN PATENT DOCUMENTS

| | | |
|---|---|---|
| EP | 0775664 A2 | 5/1997 |
| JP | 50-141380 U | 11/1975 |
| JP | 05-246533 A | 9/1993 |
| JP | 09-151091 A | 6/1997 |

* cited by examiner

*Primary Examiner* — Tony Winner
(74) *Attorney, Agent, or Firm* — Stuart J. West; Shaun Sluman; West & Associates, A PCx

(57) ABSTRACT

A transport apparatus for use in modular construction, specifically a dual-deck hydraulic apparatus that, while carrying a payload, can detect topology changes and adjust accordingly to keep the payload in substantially the same position. The apparatus can efficiently transport modular building components while preventing torsion and other damage. The apparatus can also adapt to off-load modules to foundations or multi-story heights.

8 Claims, 22 Drawing Sheets

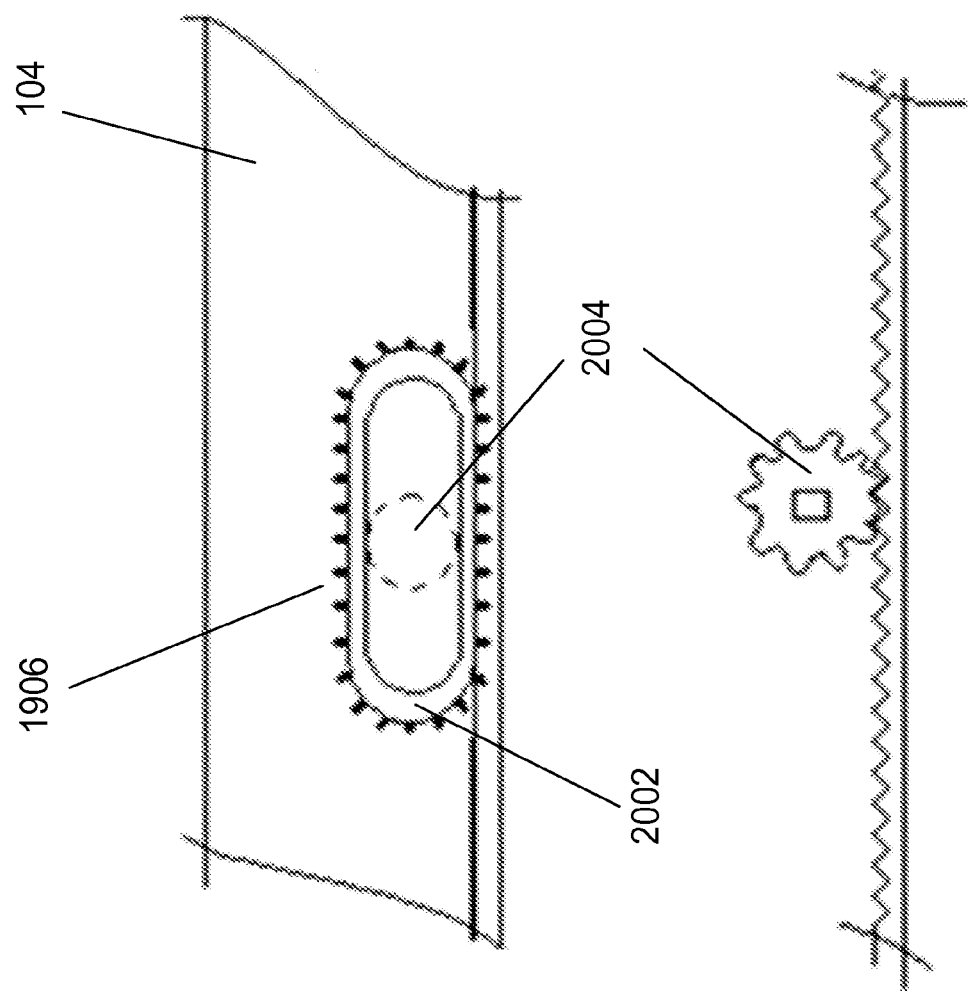

MODULAR TRANSPORT APPARATUS

CLAIM OF PRIORITY

The following application claims priority to U.S. Provisional Patent Application No. 61/172,520, filed Apr. 24, 2009, the complete contents of which are hereby incorporated by reference.

BACKGROUND

1. Field of the Invention

A transport apparatus for use in the field of building construction, specifically an apparatus for safely transporting and off-loading modular building components.

2. Background

Modular building is a popular building method by which multiple modules are manufactured off-site and subsequently transported and put together on-site. Modular building can have many advantages over traditional construction, such as being less expensive and more durable. However, the transport process is a critical and often problematic step in modular construction, since each unit must travel to the building site without suffering structural or cosmetic damage. Moreover, once on-site, the units must be carefully and precisely attached to each other, which requires placement on either a foundation or on top of another module.

Current transport and off-load methods are ineffective at adequately preventing damage to payloads. What is needed is a modular transport and placement apparatus that can safely and effectively deliver and position modular units. The apparatus should have a plurality of track-drive assemblies, which can move independently or in concert to adapt to uneven terrain. It is desirable to have a multi-deck configuration, wherein each deck can remain in a substantially horizontal and stable position during transport. The upper deck of a multi-deck apparatus should be adapted to rise above lower decks such that off-load can occur safely and within inches of a foundation or second floor level.

The apparatus should have an elevation-changing track drive for traversing complex topology contours having indifferent angles relative to each track drive assembly. The apparatus should have the ability to adapt and traverse complex terrains directed by geometry and telemetry computerization, and should be capable of terrain mapping. Most importantly, it is desirable to have an apparatus that won't twist or otherwise damage its payload while traversing 3-D terrains that vary in elevation.

BRIEF DESCRIPTION OF THE DRAWINGS

FIG. 20 depicts details of the track drive assembly shown in FIG. 19B.

DETAILED DESCRIPTION

Figure 1:
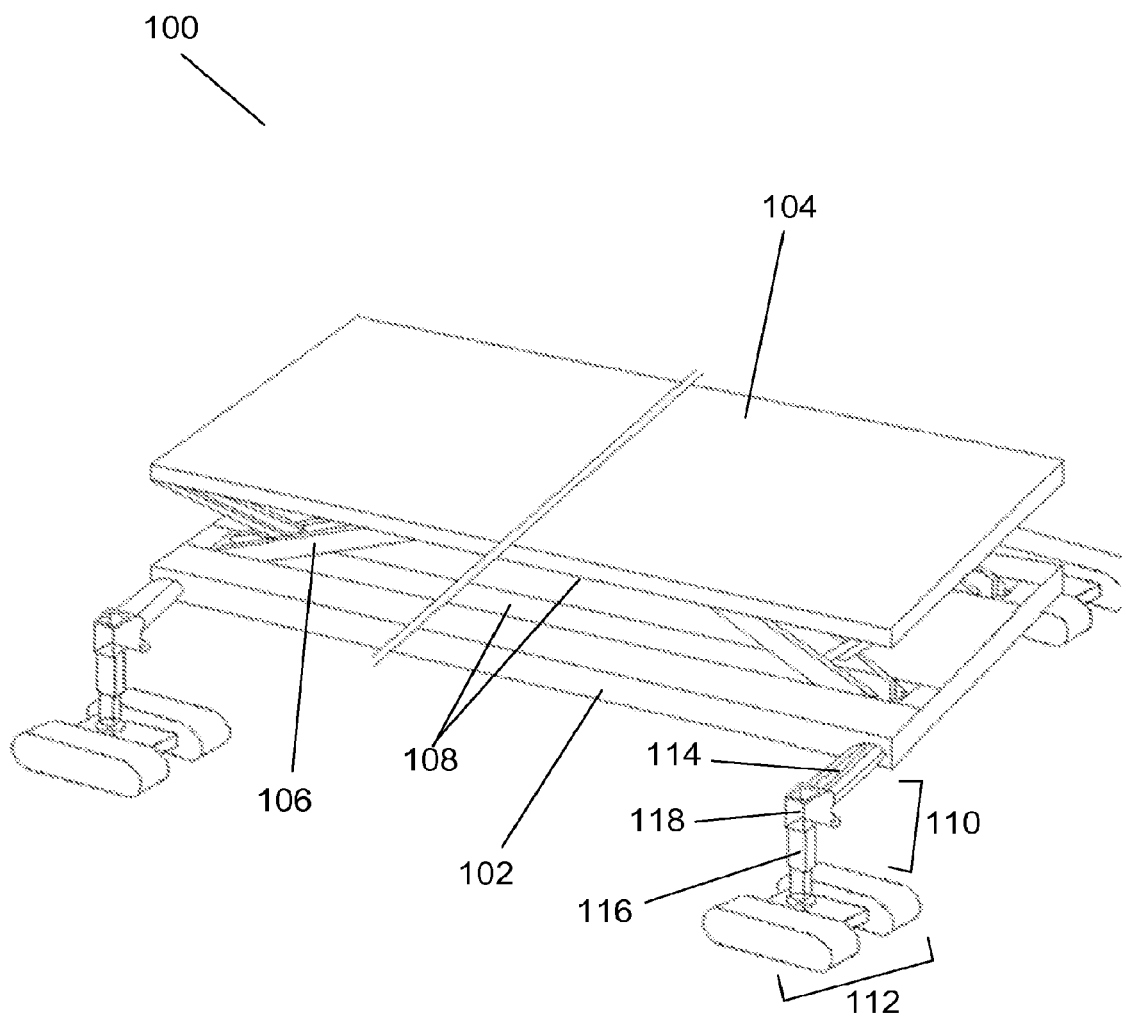
FIG. 1 depicts a perspective view of one embodiment of a transport apparatus, without a hauler assembly.

As shown in FIG. 1, a transport apparatus 100 can be comprised of a lower deck 102 coupled with an upper deck 104 via a deck lift assembly 106. The bottom surface of an upper deck 104 and the top surface of a lower deck 102 can each have a plurality of longitudinal channels 108. A plurality of channels 108 in a lower deck 102 can be pivotally coupled with a deck lift assembly 106, while a plurality of channels 108 in an upper deck 104 can be both pivotally and slidably coupled with a deck lift assembly 106. A lower deck 102 can be coupled with a plurality of leg assemblies 110, each of which can be coupled with a drive assembly 112.

An upper deck 104 can comprise a non-skid surface to restrict movement of a module during transport. In some embodiments, an upper deck 104 can comprise a plurality of roller mechanisms adapted to aid in off-loading modules. In other embodiments, an upper deck 104 can be coupled with at least one rail located proximate to an edge of the deck, in order to restrict movement of and contain a module. In other embodiments, the surface of an upper deck 104 can have any other known and/or convenient surface characteristics and/or components.

A leg assembly 110 can comprise an outrigger 114 that can extend from a lower deck 102. In FIG. 1, outriggers 114 extend from the side of and proximate to each corner of a lower deck 102. In alternate embodiments, outriggers 114 can extend from any other points along the sides of a lower deck 102. In other embodiments, outriggers 114 can be coupled with the bottom surface of a lower deck 102. In yet alternate embodiments, outriggers 114 can be coupled with a lower deck 102 in any other known and/or convenient manner and at any other known and/or convenient location. A transport apparatus 100 can comprise four leg assemblies 110, as shown in FIG. 1, but in other embodiments can have any other known and/or convenient number of leg assemblies 110.

Figure 2:
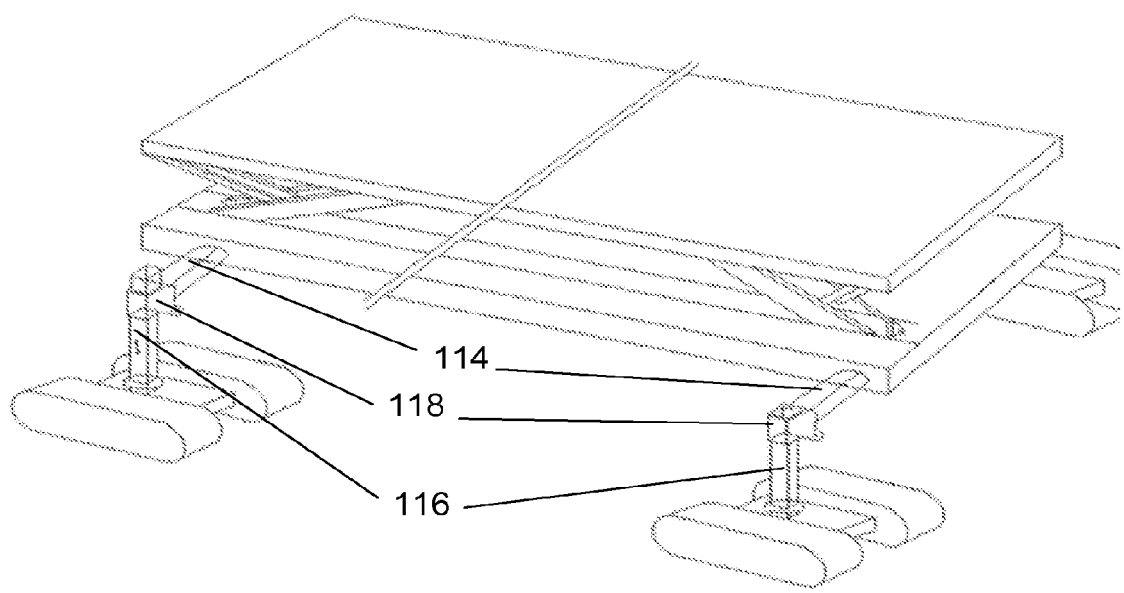
FIG. 2 depicts a perspective view of another embodiment of a transport apparatus, without a hauler assembly.

A leg assembly 110 can further comprise a leg member 116 and a leg collar 118. A leg collar 118 can couple a leg member 116 with an outrigger 114 such that the leg member and outrigger 116 114 can be substantially perpendicular, as shown in FIG. 1. In some embodiments and as shown in FIG. 1, a leg member 116 can be a telescoping member wherein one end of the leg member 116 can be fixedly coupled with a leg collar 118. In other embodiments and as shown in FIG. 2, a leg collar 118 can be slidably coupled with a non-extendable leg member 116. In alternate embodiments, a leg member 116 can have any other known and/or convenient configuration and/or characteristics, and a leg collar 118 can be coupled with a leg member 116 in any other known and/or convenient manner.

Figure 3:
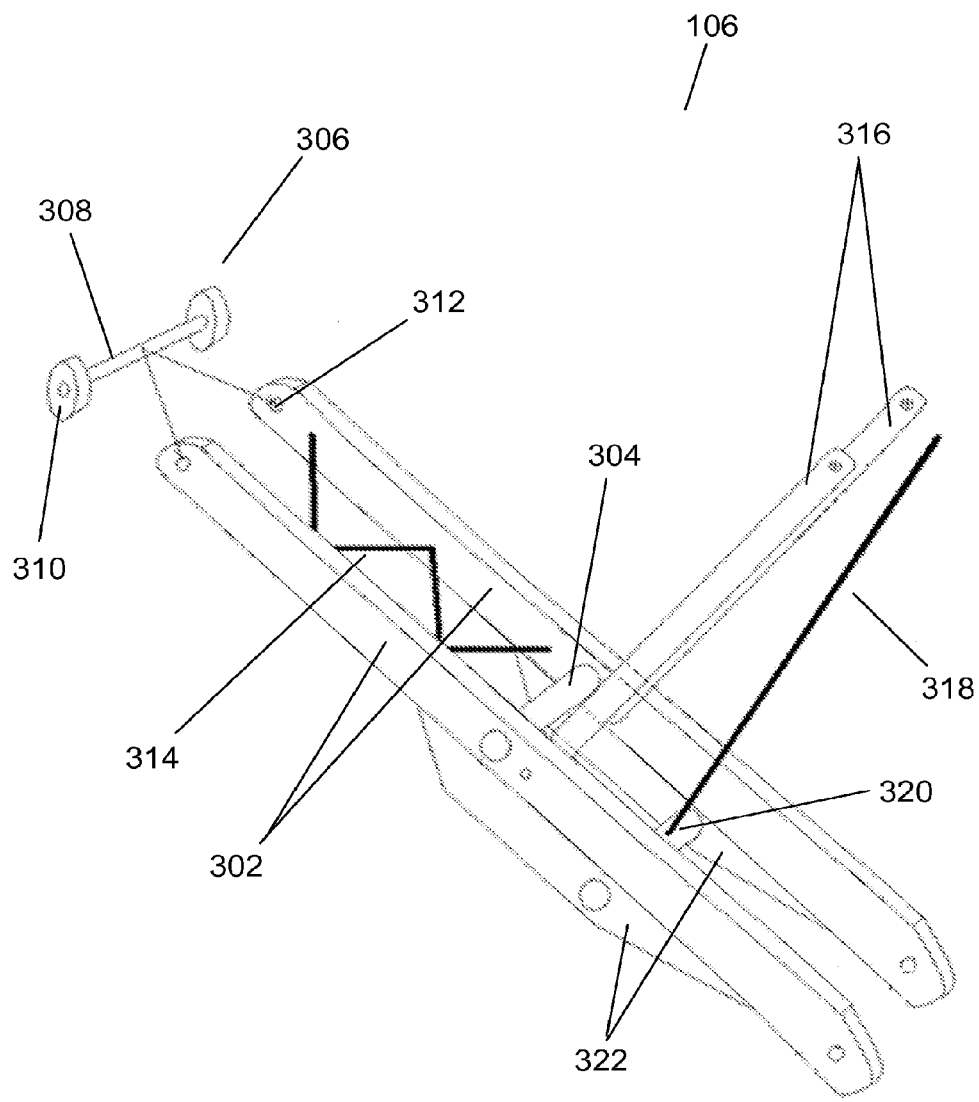
FIG. 3 depicts a perspective view of a deck lift assembly.

One embodiment of a deck lift assembly 106 is depicted in FIG. 3. A deck lift assembly can comprise a plurality of first arm members 302, a plurality of second arm members 316, and a deck lift hydraulic cylinder 318. In operation, first arm members 302, second arm members 316, and a deck lift hydraulic cylinder 318 can move in a scissor-like fashion. First arm members 302 can be substantially parallel to each other and separated a distance substantially equal to the length of a first support member 304. A first support member 304 can extend between and be substantially perpendicular to first arm members 302. First arm members 302 can further comprise a brace member 314 that can prevent buckling, longitudinal rotation, and/or torsion of each arm.

The proximal ends of first arm members 302 can be coupled with a roller assembly 306. A roller assembly 306 can comprise a roller axle 308 and a pair of roller wheels 310 coupled with the ends of the roller axle 308. A roller assembly 306 can be coupled with the proximal ends of first arm members 302 at roller assembly attachment points 312. In FIG. 3, roller assembly attachment points 312 are two apertures, one in each first arm member 302, through which a roller axle 308 can pass. In other embodiments, a roller assembly 306 can be coupled with first arm members 302 in any other known and/or convenient manner. A roller assembly 306 can be coupled with the bottom surface of an upper deck 104, explained in detail below.

Second arm members 316 can be substantially parallel, and can be pivotally coupled with first arm members 302 substantially proximate to the midpoint of first arm members 302, as shown in FIG. 3. In other embodiments, second arm members 316 can be coupled with first arm members 302 at any other known and/or convenient point along the length of first arm members 302. Second arm members 316 can be substantially parallel and can be separated by a distance less than the distance between first arm members 302, as shown in FIG. 3. However, in alternate embodiments, the distance between second arm members 316 can be greater than that between first arm members 302. In yet other embodiments, the proximal ends of second arm members 316 can be coupled with first arm members 302 in any other known and/or convenient manner. The distal ends of second arm members 316 can be pivotally coupled with the bottom surface of an upper deck 104, explained in detail below.

Each first arm member 302 can further comprise a lateral extension 322. An extension 322 on a first arm member 302 can be located at substantially the same location along its length as an extension 322 on another first arm member 302. A second support member 320 can be coupled with and substantially perpendicular to each lateral extension 322, such that first and second support members 304 320 are substantially parallel. The proximal end of a deck lift hydraulic cylinder 318 can be coupled with a second support member 320, and the distal end of the hydraulic cylinder 318 can be pivotally coupled with the bottom surface of an upper deck 104. The coupling between a hydraulic cylinder 318 and an upper deck 104 is explained below.

Figure 4:
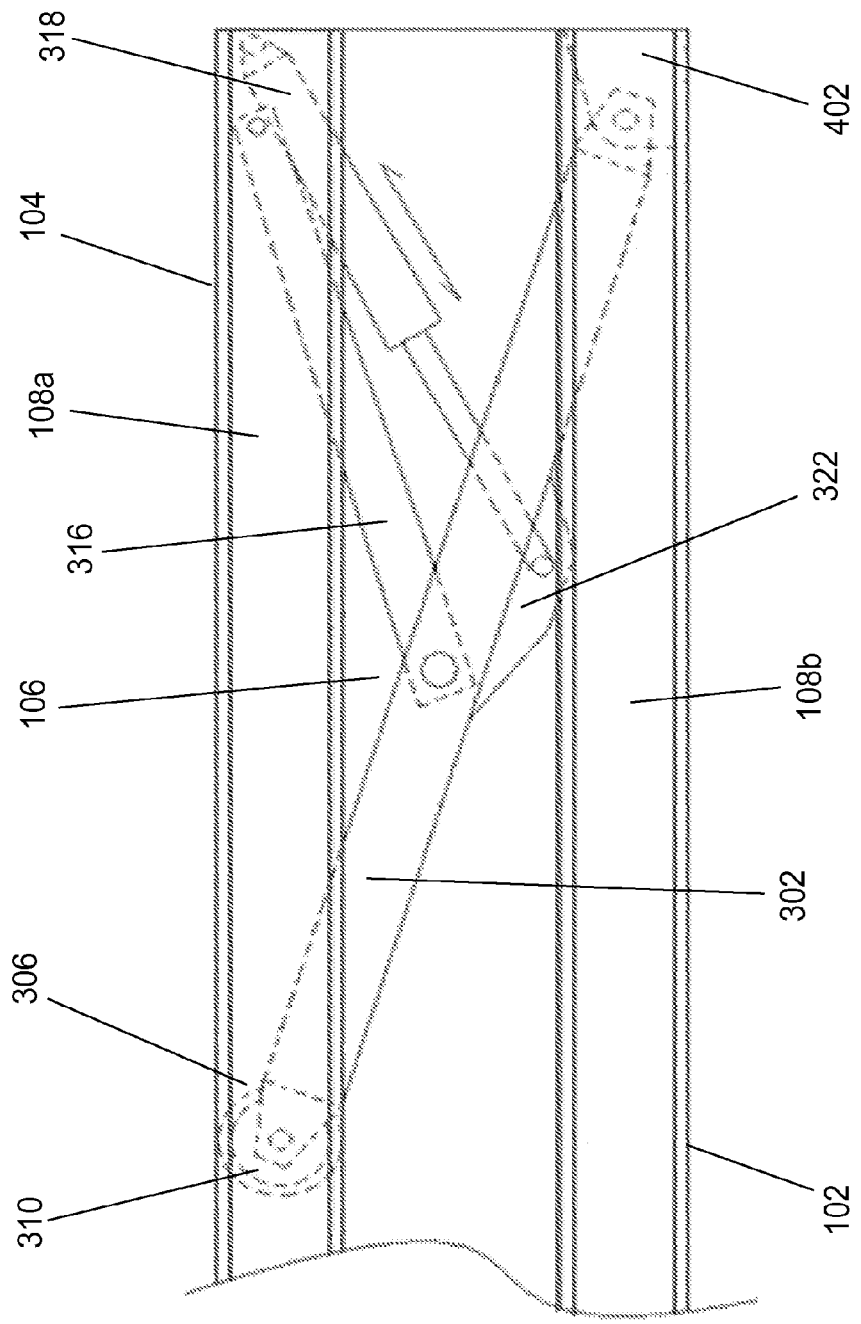
FIG. 4 depicts a side cross-section view of a deck lift assembly coupled with upper and lower decks.

FIG. 4 illustrates a side cross-section view of a lower deck 102, an upper deck 104, and a deck lift assembly 106. The proximal ends of first arm members 302 can be coupled with a roller assembly 306, which in turn can be slidably coupled with a channel 108a in an upper deck 104. The distal ends of first arm members 302 can be pivotally coupled with a channel 108b in a lower deck 102 via a backstop 402. A backstop 402 can be positioned substantially proximate to one end of a channel 108b, and can be either integral with or welded or otherwise adhered to the channel 108b. The distal ends of second arm members 316 and a hydraulic cylinder 318 can be pivotally coupled with an upper deck 104 substantially proximate to the end of a channel 108a.

Figure 5:
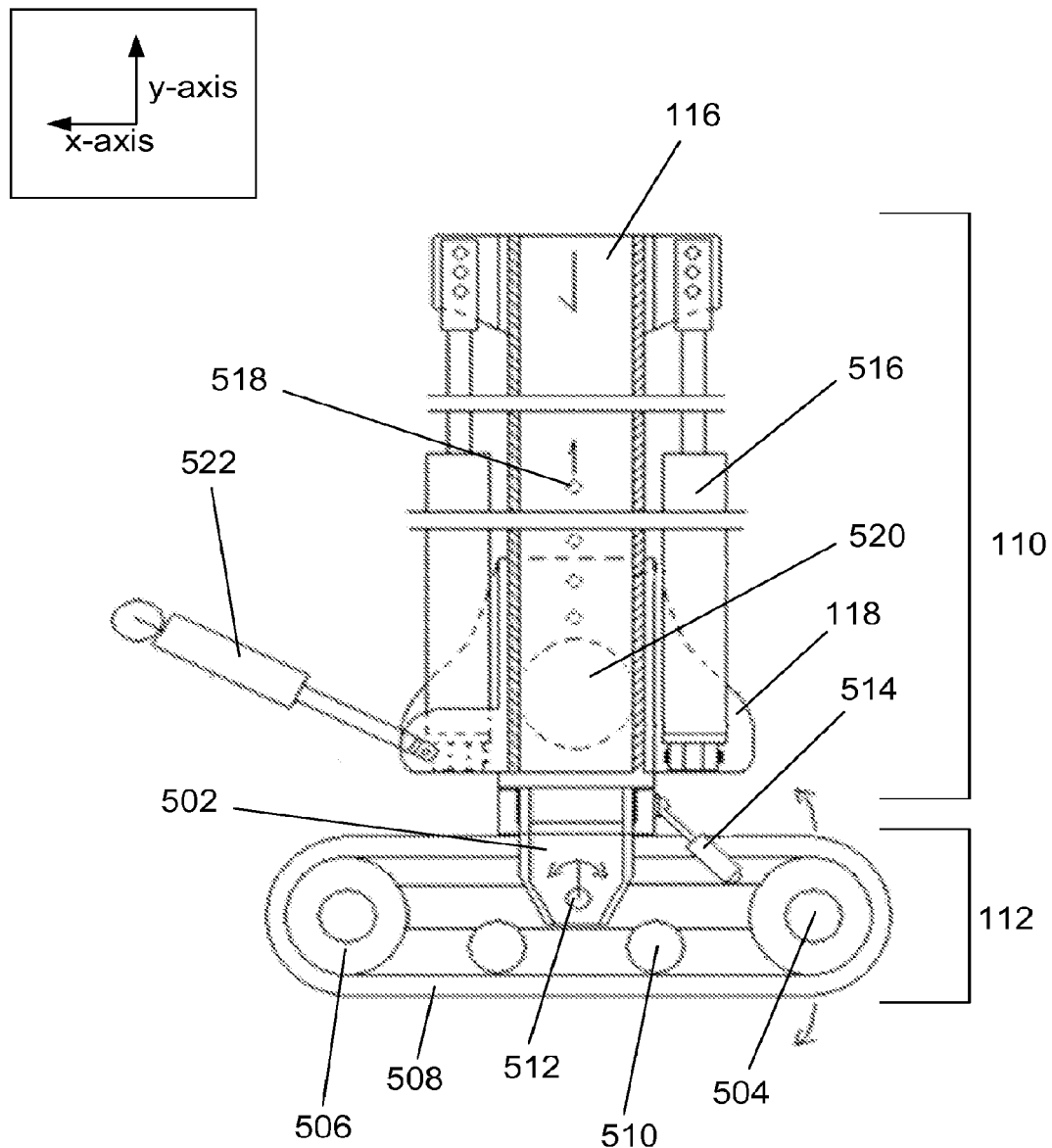
FIG. 5 depicts a side cross-section view of a leg assembly coupled with a drive assembly.

FIG. 5 depicts a side cross-section view of a leg assembly 110 coupled with a drive assembly 112. A drive assembly 112 can comprise a motor 502, at least one axle 504, a plurality of drive wheels 506, and a track 508. A track 508 can be comprised of Kevlar® or any other known and/or convenient material. As shown in FIG. 1, a drive assembly 112 can comprise dual tracks, but in other embodiments a drive assembly 112 can have any other known and/or convenient number of tracks 508. Referring back to FIG. 5, a drive assembly 112 can further comprise a plurality of bogie wheels 510 to aid in producing a smooth ride. A drive assembly 112 can tilt independent of a leg assembly 110 about a pivot point 512 via a track tilt cylinder 514, as indicated in FIG. 5.

A drive assembly 112 can be coupled with a leg assembly 110. As shown in FIG. 5, a leg assembly 110 can comprise a leg member 116 coupled with a leg collar 118. As explained above, a leg member 116 can comprise a plurality of telescoping members, and a leg collar 118 can be fixedly coupled with the leg member 116, as shown in FIG. 1. In other embodiments, and as shown in FIGS. 2, 5, a leg member 116 can be non-extendable and a leg collar 118 can be slidably coupled with leg member 116. A leg member 116 can also be coupled with at least one leg hydraulic 516 adapted to effectuate vertical movement of lower and upper decks 102 104. A leg member 116 can also be coupled with at least one shear pin 518 to guard against damage to other components in the event of uncontrolled movement of either a telescoping leg member 116 and/or a sliding leg collar 118.

FIG. 5 shows the orientation of the x-axis and y-axis relative to the diagram, with the z-axis following the right-hand rule. As depicted in FIG. 5, a leg assembly 110 can rotate about the y-axis via a leg rotation cylinder 522. Moreover, a leg assembly 110 can rotate about the z-axis via rotation of an outrigger 114 coupled with a leg collar 118. Rotation of an outrigger 114 can be accomplished by engaging components housed within a lower deck 102, explained below.

Figure 6:
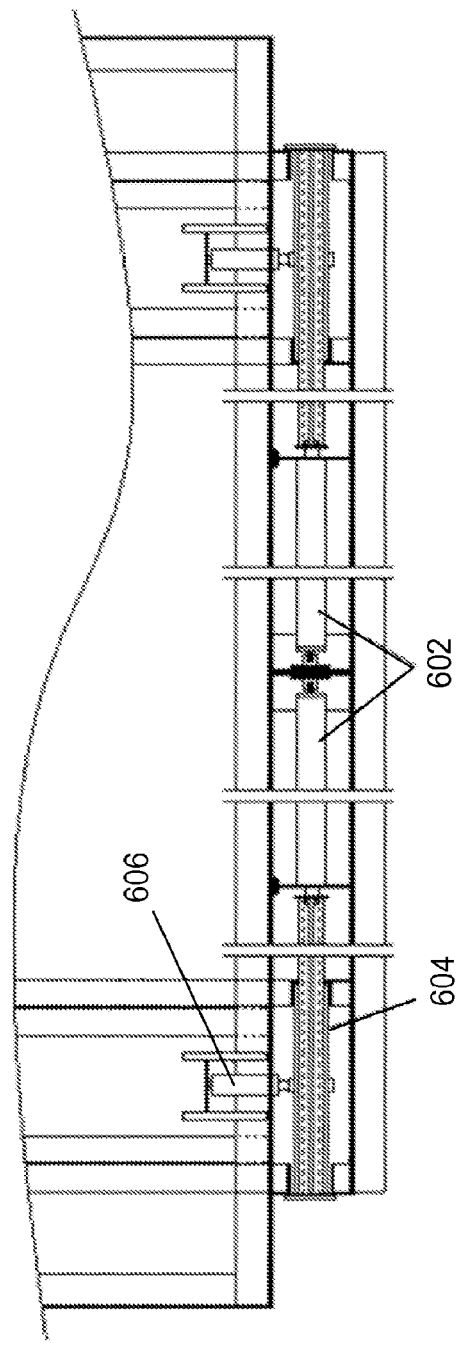
FIG. 6 depicts an end cross-section view of a lower deck coupled with a hydraulic assembly.

FIG. 6 shows the orientation of the z-axis and y-axis relative to the diagram, with the x-axis following the right-hand rule. As illustrated in FIG. 6, a plurality of hydraulic pistons 602 and a plurality of outrigger shafts 604 can be housed within the lower deck 102 of a transport apparatus 100. An outrigger 114 can be coupled with a substantially horizontal hydraulic piston 602 and an outrigger shaft 604. In use, a retracted hydraulic piston 602 can protract, thus driving an outrigger 114 laterally outward so as to expose a greater segment of an outrigger 114. In some embodiments, as shown in FIG. 6, an outrigger rotation cylinder 606 can be coupled with an outrigger 114 such that, when the rotation cylinder 606 is actuated, an outrigger 114 can rotate about the z-axis.

Figure 7A:
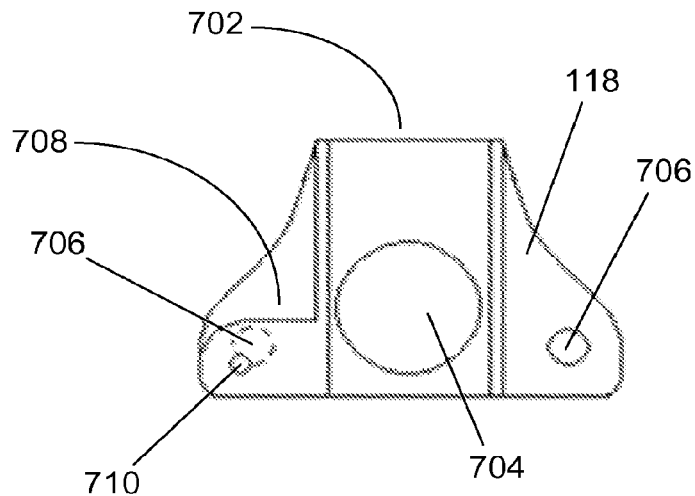
FIG. 7A depicts a side view of a leg collar.
Figure 7B:
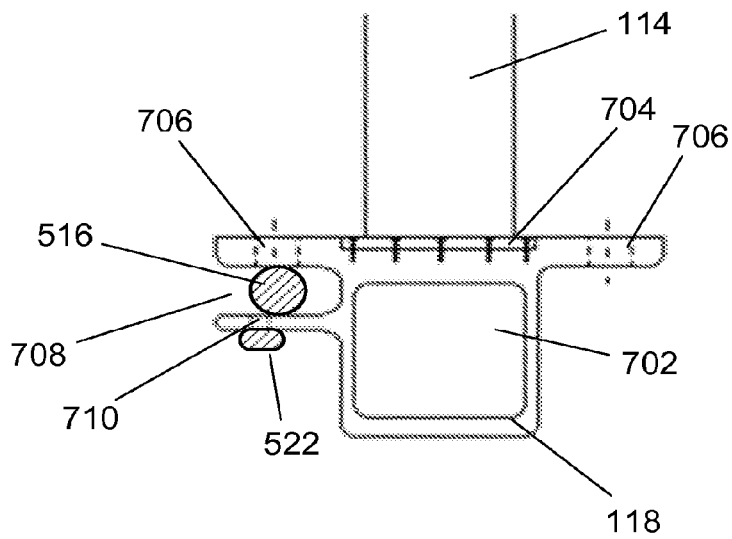
FIG. 7B depicts a top cross-section view of a leg collar coupled with an outrigger.

FIG. 7A depicts a side view of the leg collar 118 shown in FIG. 5. FIG. 7B depicts a top cross-section view of leg collar 118 coupled with a leg hydraulic 516 and a leg rotation cylinder 522. A leg collar 118 can comprise a leg member shaft 702 having a cross-section geometry adapted to accommodate the geometry of a leg member 116. An outrigger 114 can couple with a leg collar 118 at an outrigger connection point 704, via screws, pins, adhesive, ultrasonic bonding, welding or any other known and/or convenient method of coupling. A leg collar 118 can comprise at least one leg hydraulic coupling 706, such that, for the embodiment shown in FIG. 5, one end of a leg hydraulic 516 can be fixedly coupled with the leg collar 118. In other embodiments, a leg hydraulic 516 can be slidably coupled with a leg collar 118. In yet other embodiments, a leg hydraulic 516 can be coupled with a leg collar 118 in any other known and/or convenient manner. As shown in FIGS. 7A, 7B, a leg collar 118 can further comprise at least one leg hydraulic pocket 708. In some embodiments, a leg rotation cylinder 522 can be pivotally coupled with a leg collar 118 via a leg rotation cylinder pivot point 710.

Figure 8A:
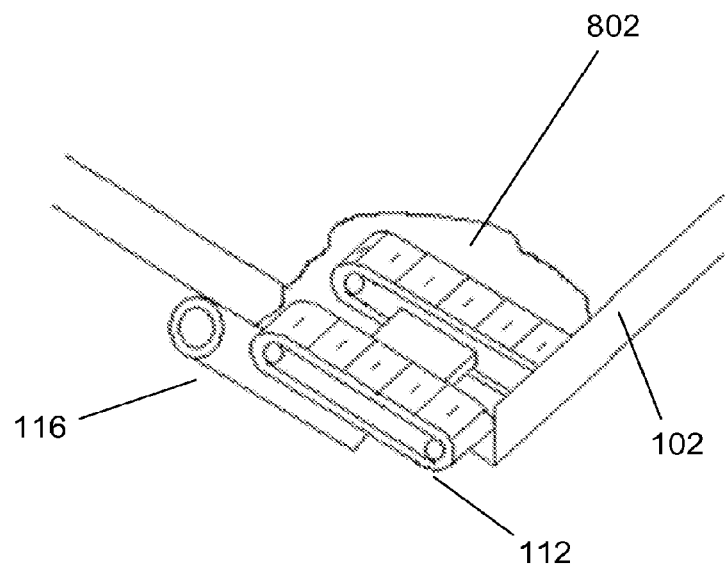
FIG. 8A depicts one configuration for stowing a drive assembly.
Figure 8B:
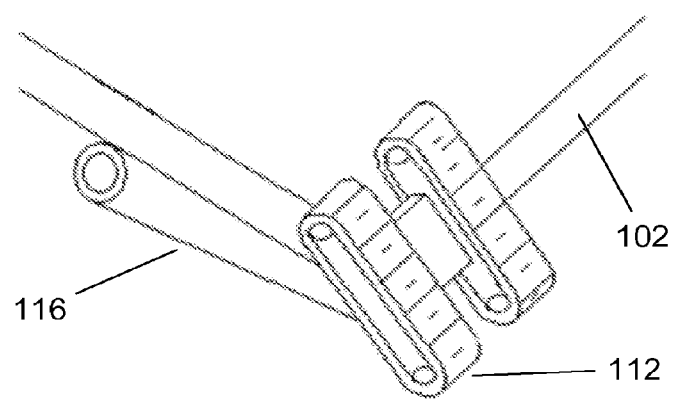
FIG. 8B depicts another configuration for stowing a drive assembly.

FIG. 8 illustrates two non-limiting examples of stow options for a drive assembly 112 during transport of a transport apparatus 100. In FIG. 8A, a drive assembly 112 can retract into a cutaway 802 in a lower deck 102. In such an embodiment, both a leg member 116 and a drive assembly 112 can be substantially parallel to a lower deck 102. In another embodiment, as shown in FIG. 8B, a leg member 116 can be substantially parallel to and positioned proximate to the underside of a lower deck 102, while a drive assembly 112 can be positioned against one edge of a lower deck 102 in a skewed position. The abovementioned examples are non-limiting and it is recognized that several other stow mechanisms and/or configurations are available.

Figure 9:
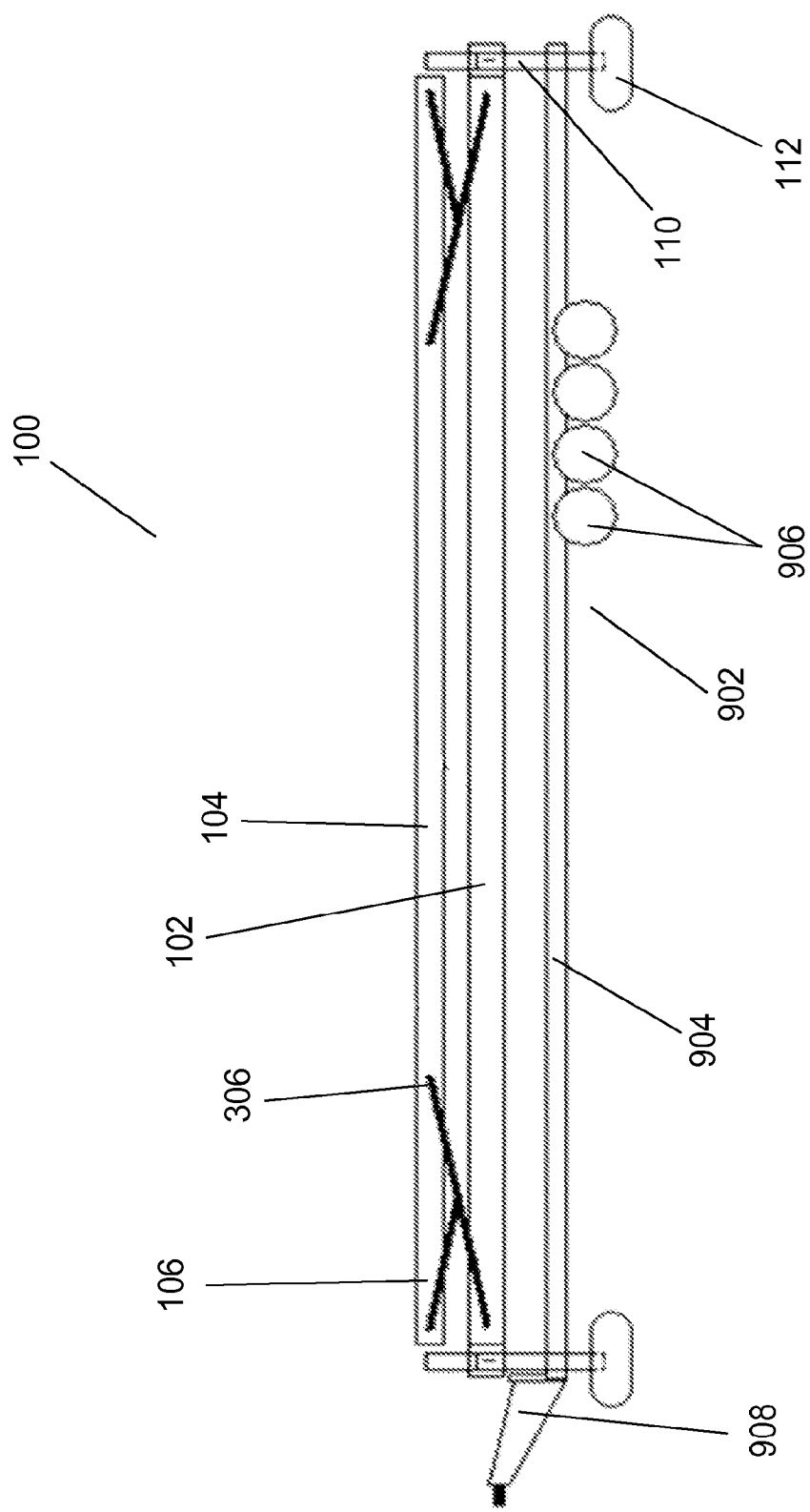
FIG. 9 depicts a side view of a transport apparatus, including a hauler assembly, in a raised position.
Figure 10A:
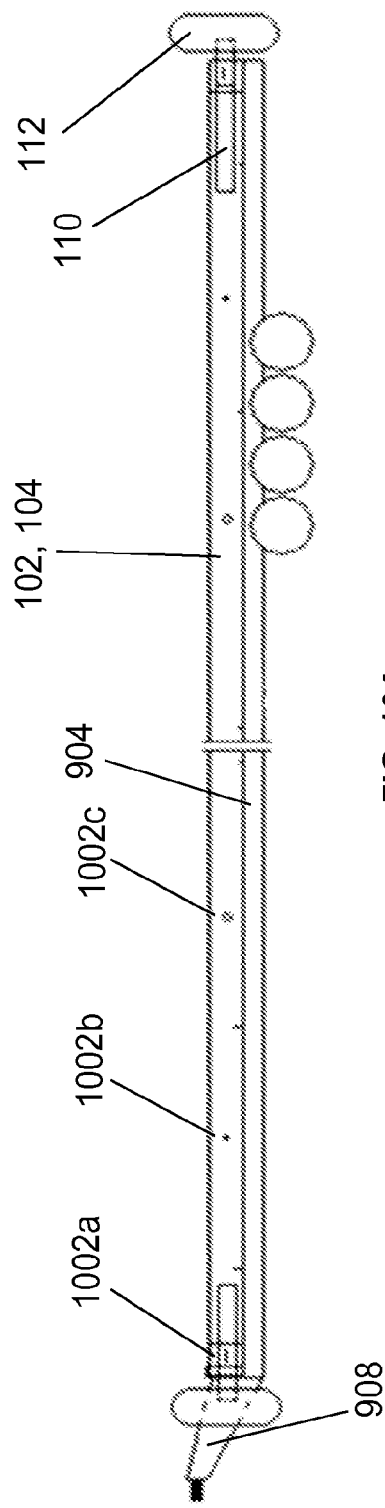
FIG. 10A depicts a side view of a transport apparatus, including a hauler assembly, in a retracted position.

As shown in FIGS. 9, 10, a transport apparatus 100 can further comprise a hauler assembly 902 to provide safe and efficient transport of a module. A hauler assembly 902 can comprise a hauler frame 904 positioned underneath and substantially parallel to lower and upper decks 102 104. A hauler frame 904 can have substantially similar geometry as lower and/or upper decks 102 104, as depicted in FIGS. 9, 10A. In other embodiments, a hauler frame 904 can have any other known and/or convenient geometry. A hauler frame 904 can comprise at least one set of hauler wheels 906 adapted to at least partially support the weight of a transport apparatus 100 and its payload. A hauler frame 904 can further comprise a tongue assembly 908 adapted to selectively couple with a truck or other motor vehicle. In the embodiment depicted in FIG. 9, a hauler assembly 902 is fixedly coupled with the rest of a transport apparatus 100. In other embodiments, a hauler assembly 902 can be selectively detachable.

During short-haul transport, such as when traveling on-site, a leg assembly 110 can have an in-use configuration such that a drive assembly 112 is in contact with a desired ground surface, as shown in FIG. 9. In such a configuration, at least one set of hauler wheels 906 can be raised off the ground surface and leg and drive assemblies 110 112 can support the entirety of a transport apparatus 100. In other configurations, drive assemblies 112 and at least one set of hauler wheels 906 can simultaneously be in contact with a ground surface such that the weight of a transport apparatus 100 is distributed among the drive assemblies and hauler wheels 112 906.

In long-haul transport, an upper deck 104 can recess into and be flush with a lower deck 102. Lower and upper decks 102 104 can rest on top of a hauler frame 904, and leg and drive assemblies 110 112 can be in a stowed configuration. As shown in FIG. 10A, in a stowed configuration leg assemblies 110 can be substantially parallel to and planar with lower and upper decks 102 104. Drive assemblies 112 can be positioned substantially proximate to and perpendicular to the ends of a transport apparatus 100, such that drive assemblies 112 are raised above the ground surface.

Figure 10B:
FIG. 10B depicts a side view of several cam lock mechanisms.
Figure 10C:
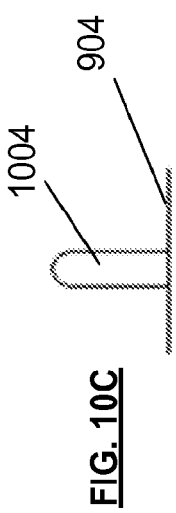
FIG. 10C depicts a side view of a frame stud.
Figure 11:
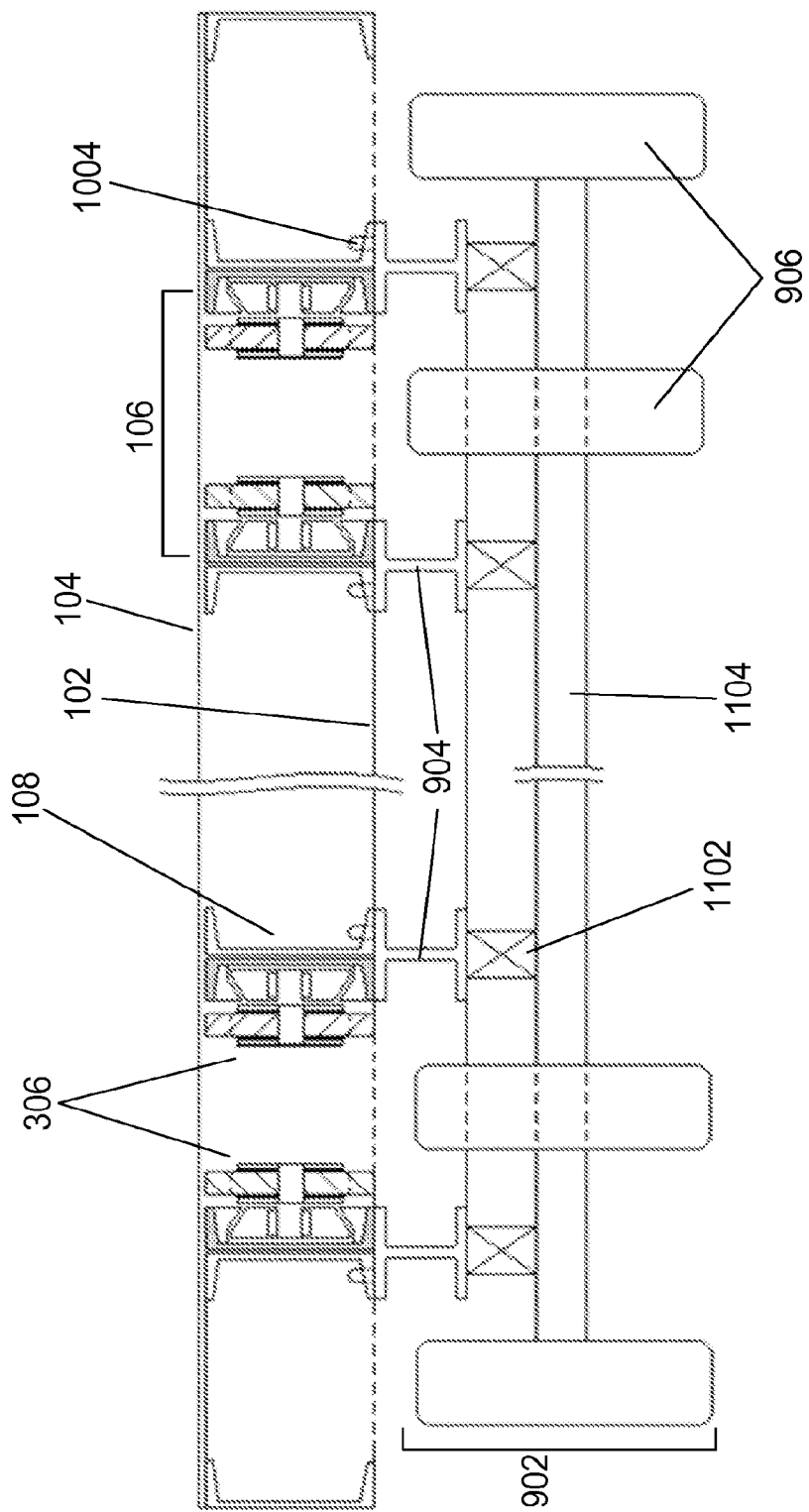
FIG. 11 depicts an end cross-section view of a retracted transport apparatus and hauler assembly.

An upper deck 104 and a lower deck 102 can be secured to a hauler frame 904 via anchoring mechanisms 1002. As shown in FIG. 10A, a first anchoring mechanism 1002a can secure a leg assembly 110; a second anchoring mechanism 1002b can secure a deck lift assembly 106; and a third anchoring mechanism 1002c can secure a roller assembly 306. As illustrated in FIG. 10B, anchoring mechanisms 1002 can be cam lock mechanisms, however in other embodiments, an upper deck 104 can be secured to a lower deck 102 via any other known and/or convenient mechanism. As shown in FIG. 10c, a plurality of control studs 1004 can be coupled with a hauler frame 904 and can extend into sockets in lower and/or upper decks 102 104. Control studs 1004 can both aid in proper alignment and control lateral motion when a transport apparatus 100 is in a retracted position for transport or storage, as shown in FIG. 10A. FIG. 11 illustrates an alternate view of control studs 1004 coupled with upper and lower decks 104 102.

FIG. 11 depicts a latitudinal cross-section view of a transport apparatus 100, including its hauler assembly 902. A hauler frame 904 can further comprise a suspension system 1102 and at least one hauler axle 1104 coupled with hauler wheels 906. FIG. 11 further illustrates lift assemblies 106 coupled with channels 108. As shown, channels 108 can be C-channels adapted to accept and provide stability for roller assemblies 306.

Figure 12:
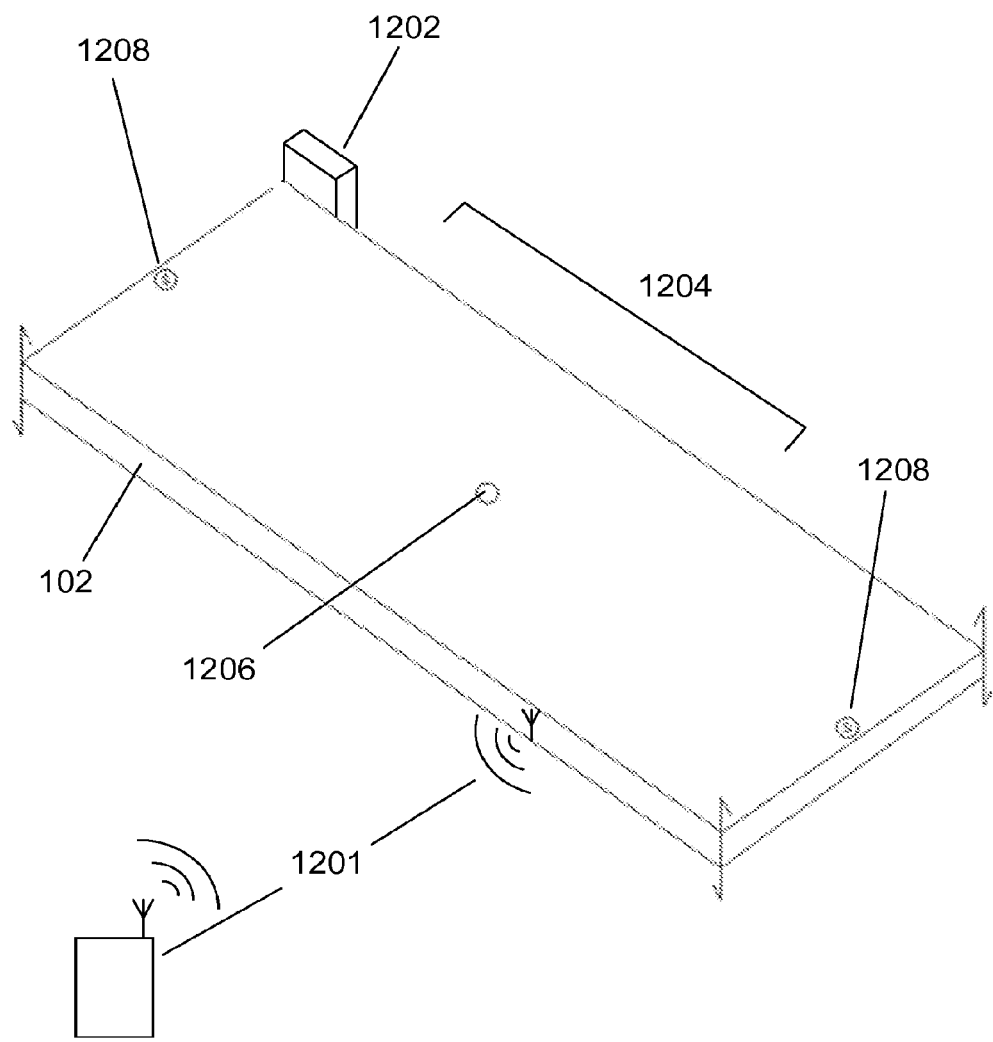
FIG. 12 depicts a leveling system of a lower deck.

As shown in FIG. 12, a transport apparatus 100 can be operated via wireless controls 1201. In some embodiments, a transport apparatus 100 can comprise an operator box 1202 for manned control in lieu of or in addition to wireless controls 1201.

Referring to FIG. 12, a transport apparatus 100 can have a leveling system 1204 to prevent damage to a payload by detecting and compensating for undesirable movement of decks 102 104. A leveling system 1204 can comprise a master sensor 1206 and a plurality of torsion control sensors 1208, each coupled with a lower deck 102. A master sensor 1206 can be a gyroscope that can determine orientation of a lower deck 102 in any axis at a desired time, and can be positioned substantially at the center of a lower deck 102. In other embodiments, a master sensor 1206 can be any other known and/or convenient mechanism for detecting deck orientation. A plurality of torsion control sensors 1208 can be positioned substantially proximate to the midpoint of each end of a lower deck 102, as shown in FIG. 12. Torsion control sensors 1208 can detect any twisting of a lower deck 102 relative to its center. Although FIG. 12 depicts two torsion control sensors 1208, alternate embodiments can include any other known and/or convenient number of torsion control sensors 1208, and sensors 1208 can be coupled with a lower deck 102 at any other known and/or convenient location on or within a lower deck 102. Torsion control sensors 1208 can operate in concert or independent of each other.

Figure 13:
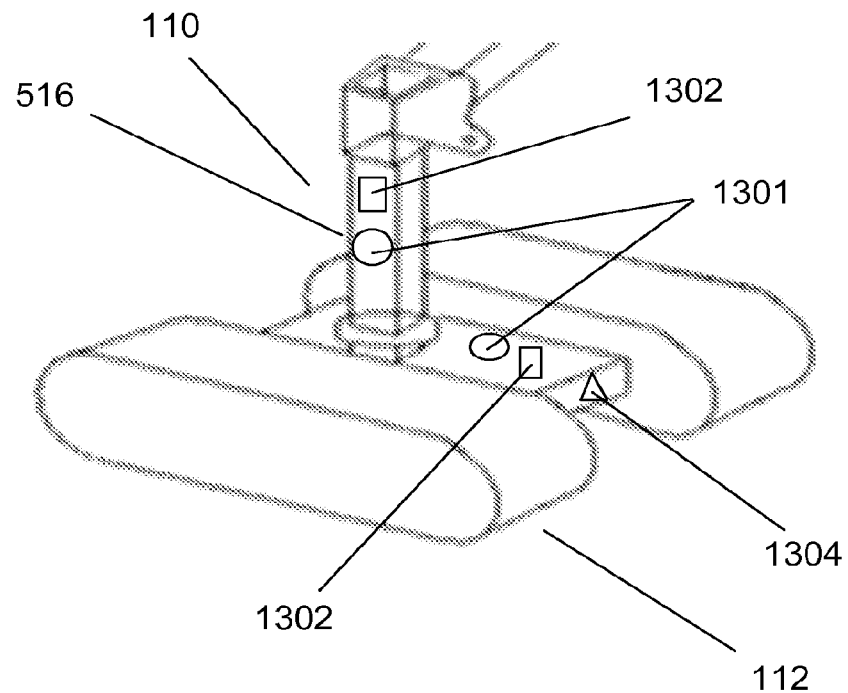
FIG. 13 depicts an isometric view of sensors coupled with leg and drive assemblies.

As depicted in FIG. 13, a transport apparatus 100 can further comprise a plurality of distance sensors 1301. In some embodiments, a leg assembly 110 can comprise at least one distance sensor 1301 coupled with a leg hydraulic 516. A distance sensor 1301 coupled with a leg hydraulic 516 can be adapted to detect the distance between a predetermined point on a hydraulic 516 and a ground surface, other components of an apparatus 100, and/or external objects. In some embodiments, a drive assembly 112 can be coupled with at least one distance sensor 1301 adapted to measure the distance to a target point on the ground surface before a drive assembly 112 reaches it. Distance sensors 1301 can be inactive when an apparatus 100 is without payload and/or during highway transport, and can be selectively activated when carrying a payload, or at any other known and/or convenient time determined by an operator.

At least one speed sensor 1302 can be coupled with a leg assembly 110 and/or a drive assembly 112, as shown in FIG. 13. Speed sensors 1302 can provide feedback regarding the ground speed of an apparatus 100, such that a leveling system 1204 can compare the ground speed with the speed required to negotiate surface variations. A leveling system 1204 can then instruct drive assemblies 112 to increase or decrease track speed, either in concert or individually. In some embodiments, a drive assembly 112 can comprise at least one surface scanner 1304 that can detect surface conditions, such as wet or dry soil or clay, loose gravel, or any other desired surface condition parameter. Once a surface scanner 1304 provides feedback, a leveling system 1204 can instruct leg and/or drive assemblies 110 112 accordingly.

Figure 14:
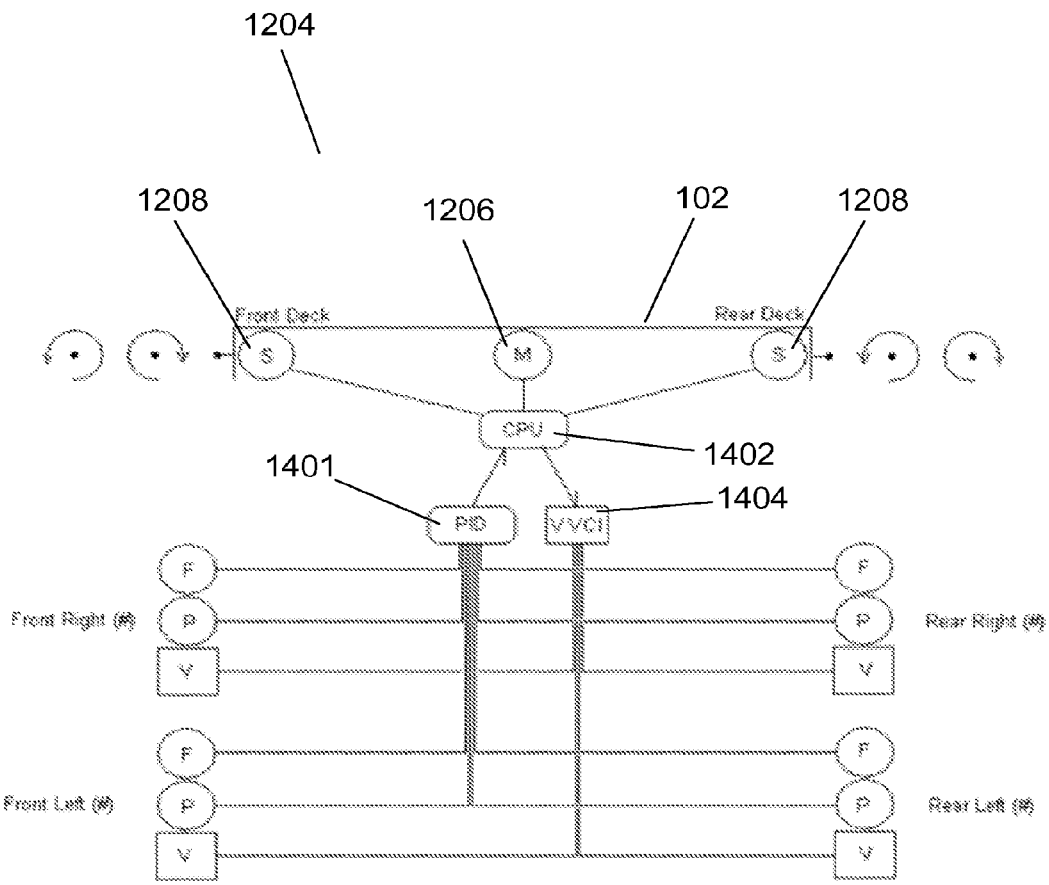
FIG. 14 depicts a schematic for the operation of a leveling system.

FIG. 14 illustrates a schematic of one embodiment of the process by which a leveling system 1204 can operate. A proportional integral differential control 1401 can collect feedback from sensors and scanners coupled with front and rear leg and drive assemblies 110 112. This feedback can then be transmitted to a central processing unit (CPU) 1402. A master sensor 1206 and torsion control sensors 1208 can also provide feedback to a CPU 1402. Once a CPU 1402 collects necessary data, it can then process it and send the result to a variable valve control interface 1404, which in turn can determine desired XYZ plane positioning and instruct leg or other hydraulics to modify their positions accordingly. Appropriate actuation instructions can control deck lift assemblies 106, tilting of drive assemblies 112, outrigger 114 extension and rotation, and any other known and/or convenient component or assembly of an apparatus 100. This process can ensure proper leveling of upper and lower decks 104 102 of an apparatus 100.

Data from a master sensor 1206, torsion control sensors 1208, sensors 1301 1302, and surface condition scanners 1304, can be collected in real-time to provide immediate processing and commands. In some embodiments, an apparatus 100 can be equipped with global positioning system capabilities.

Figure 15:
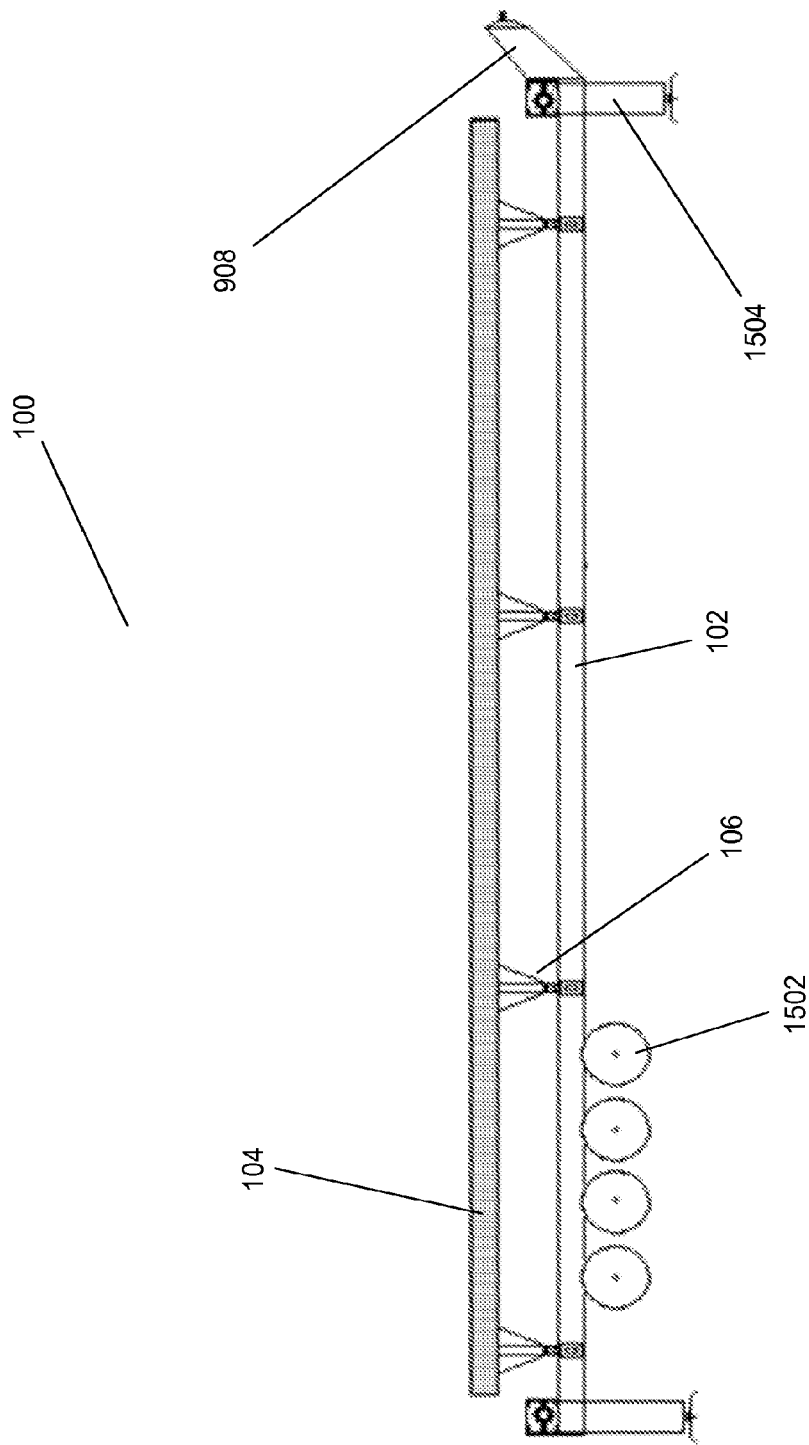
FIG. 15 depicts an alternate embodiment of an extended transport apparatus.
Figure 16:
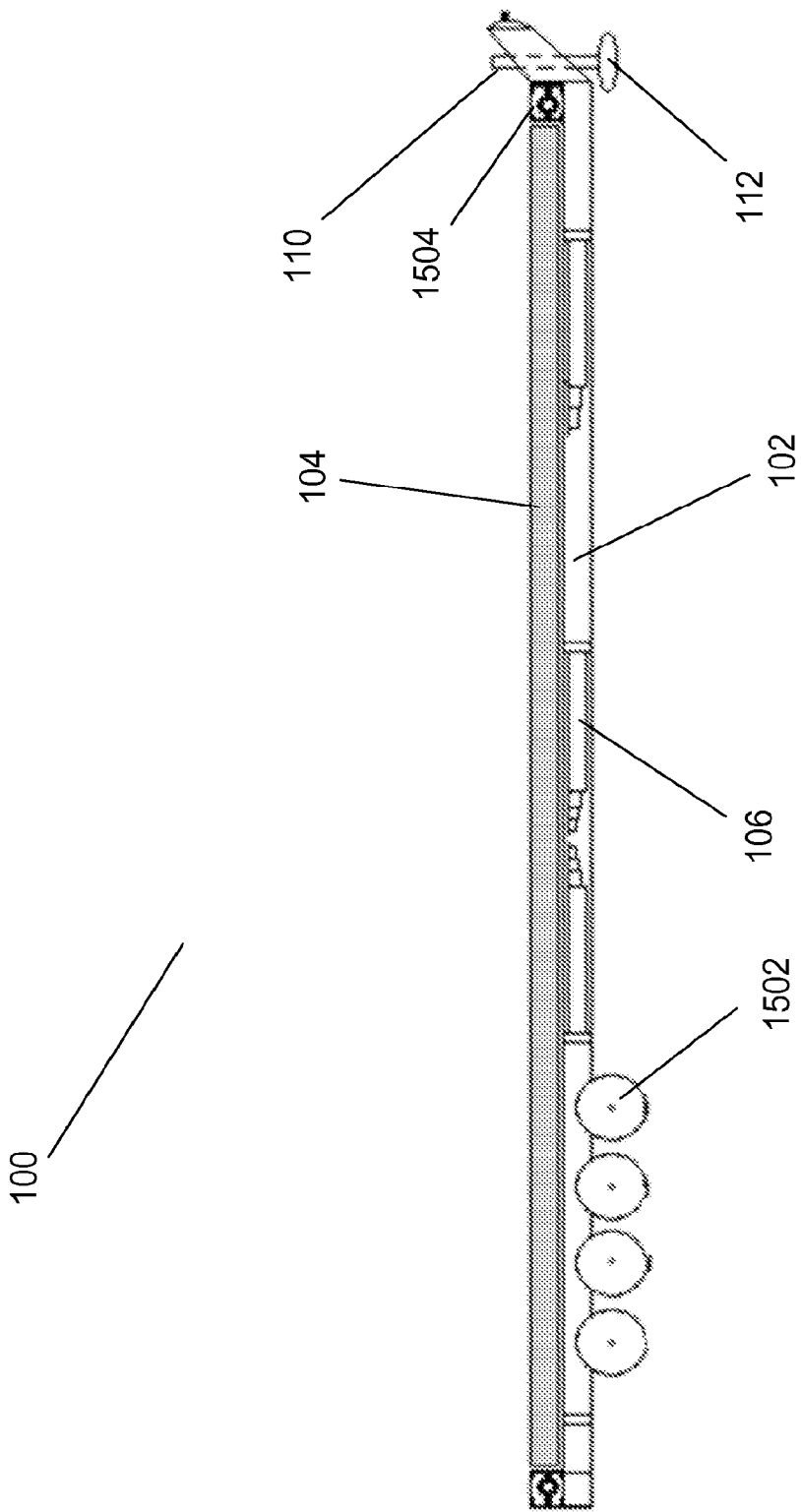
FIG. 16 depicts the embodiment of FIG. 15 in a retracted position.

An alternate embodiment of a transport apparatus 100 is shown in FIGS. 15-22. FIG. 15 illustrates a transport apparatus 100 in a raised configuration and FIG. 16 illustrates a transport apparatus 100 in a retracted configuration. This embodiment of a transport apparatus 100 can utilize an over-the-road assembly comprising a lower deck 102, an upper deck 104, and a wheel assembly 1502. The over-the-road assembly can be disconnected from a tractor truck via a tongue assembly 908 and a small track drive unit. This unit can manipulate the over-the-road assembly into tighter spots than possible with a tractor truck.

A lower deck 102 can be limited in height for purposes of over-the-road transport. Foundations can vary in elevation from a few inches to as much as five feet, thus a transport apparatus 100 as depicted in FIGS. 15-16 can be designed to deliver payload to foundations given those limitations.

Figure 17A:
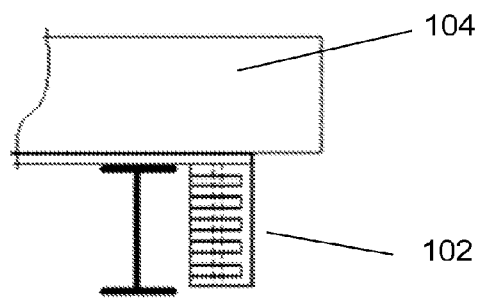
FIG. 17 depicts a bridge assembly of one embodiment of a transport apparatus.
Figure 17B:
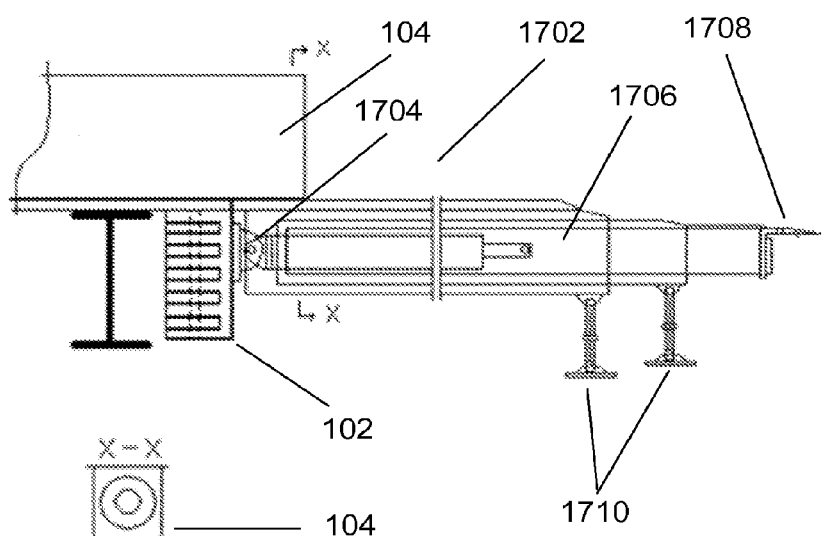
Figure 17C:
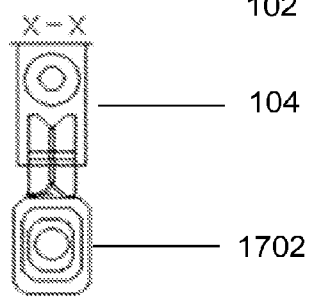

A bridge assembly 1702 is depicted in FIG. 17. In FIG. 17A, a lower deck 102 is coupled with a bridge assembly 1702, which is hidden within the framework of a lower deck 102. In other embodiments, a bridge assembly 1702 can be coupled with an upper deck 104. In FIG. 17B, a bridge assembly 1702 is shown in an extended position and comprises a hinge mechanism 1704, telescoping rail extension 1706, a foundation coupling 1708, and at least one vertical support member 1710. Telescoping rail extensions 1706 can be adapted to couple with a foundation if lower than a transport apparatus 100, or to a wall should the foundation be higher than a transport apparatus 100. An upper deck 104 can traverse a lower deck 102 onto telescoping rail extensions 1706 and thus onto a foundation. A lateral positive track drive can push a payload unit from a transport apparatus 100 onto a foundation. As a transport apparatus 100 retracts, a payload can be stationary by friction, onsite cables, or any other known and/or convenient mechanism or method. The payload can oscillate laterally until it has departed from the limitation of an upper deck 104.

Figure 18:
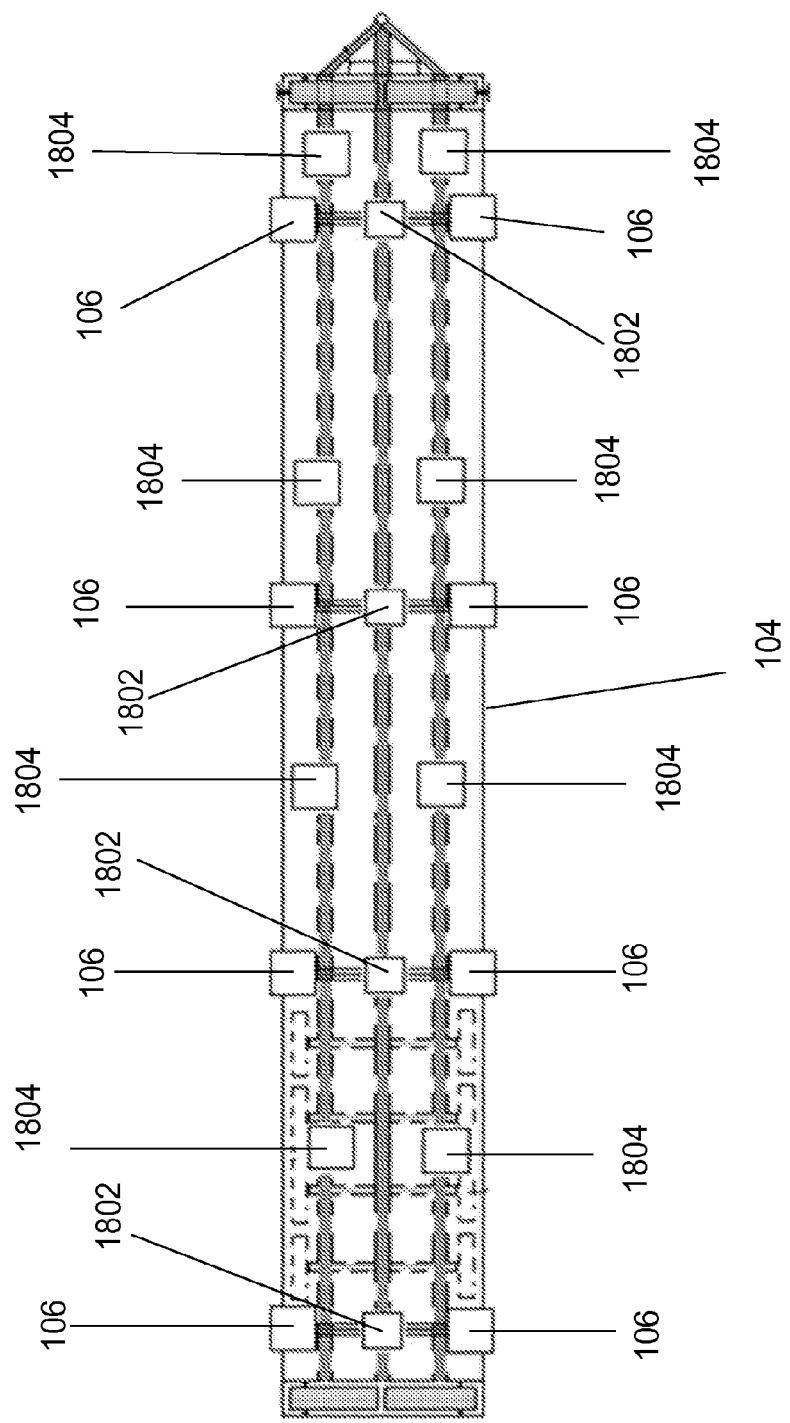
FIG. 18 depicts a top view of a transport apparatus, showing a plurality of payload drives, deck lift assemblies, and locking pin sets.
Figure 19A:
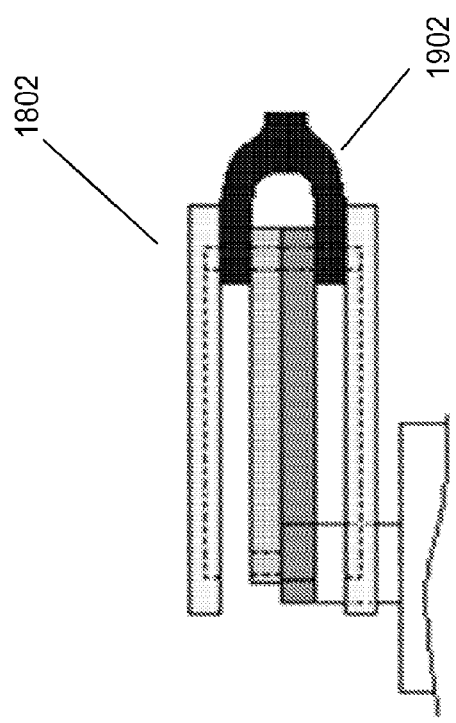
FIG. 19 depicts two embodiments of a payload drive.
Figure 19B:
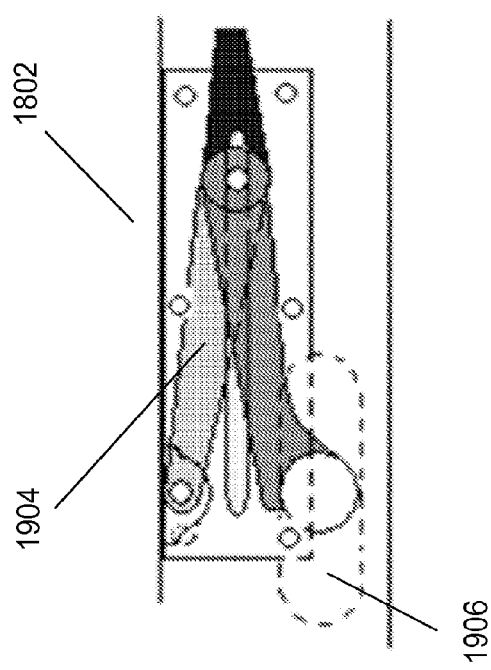

As shown in FIG. 18, the upper deck 104 of a transport apparatus 100 can further comprise at least one payload drive 1802, at least one deck lift assembly 106, and at least one set of locking pins 1804. FIGS. 19-20 show details of a payload drive 1802. As illustrated in FIG. 19, a payload drive 1802 can comprise a hydraulic lift 1902 (FIG. 18A), a scissor lift mechanism 1904 (FIG. 18B), or any other known and/or convenient lift mechanism. The track drive assembly 1906 of FIG. 19B is shown in more detail in FIG. 20. A track drive assembly 1906 can comprise a track 2002 and a drive shaft 2004.

Figure 21A:
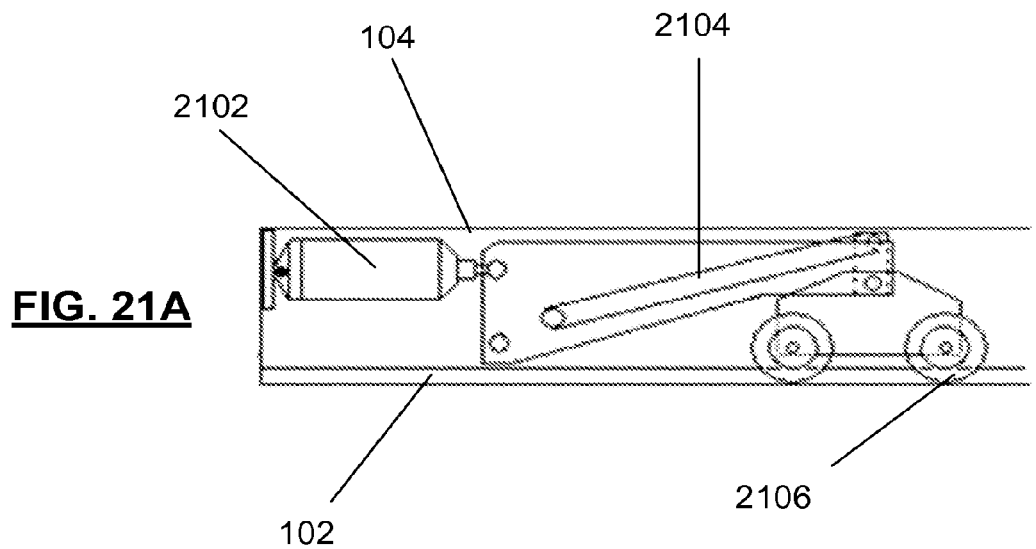
FIG. 21 depicts retracted and extended positions of one embodiment of a deck lift assembly.
Figure 21B:
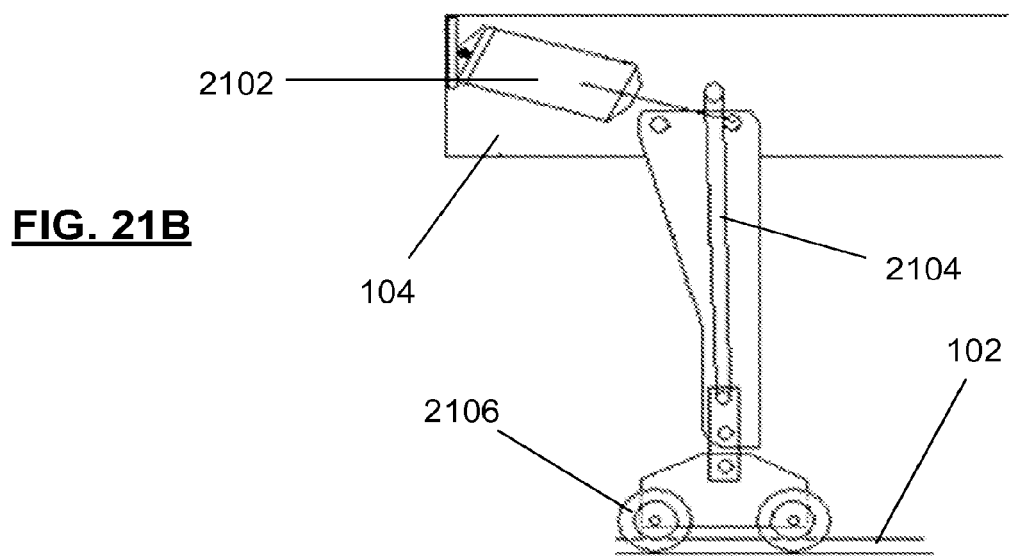

FIG. 21 depicts an embodiment of a deck lift assembly 106. FIG. 21A shows the deck lift assembly 106 in a retracted position, and FIG. 21B shows the deck lift assembly 106 in a raised position. A deck lift assembly 106 coupled with upper and lower decks 104 102 can comprise a lift drive 2102, at least one pivot arm 2104, and a wheel assembly 2106. A lift drive 2102 can be a hydraulic, worm drive, or any other known and/or convenient drive mechanism.

Figure 22:
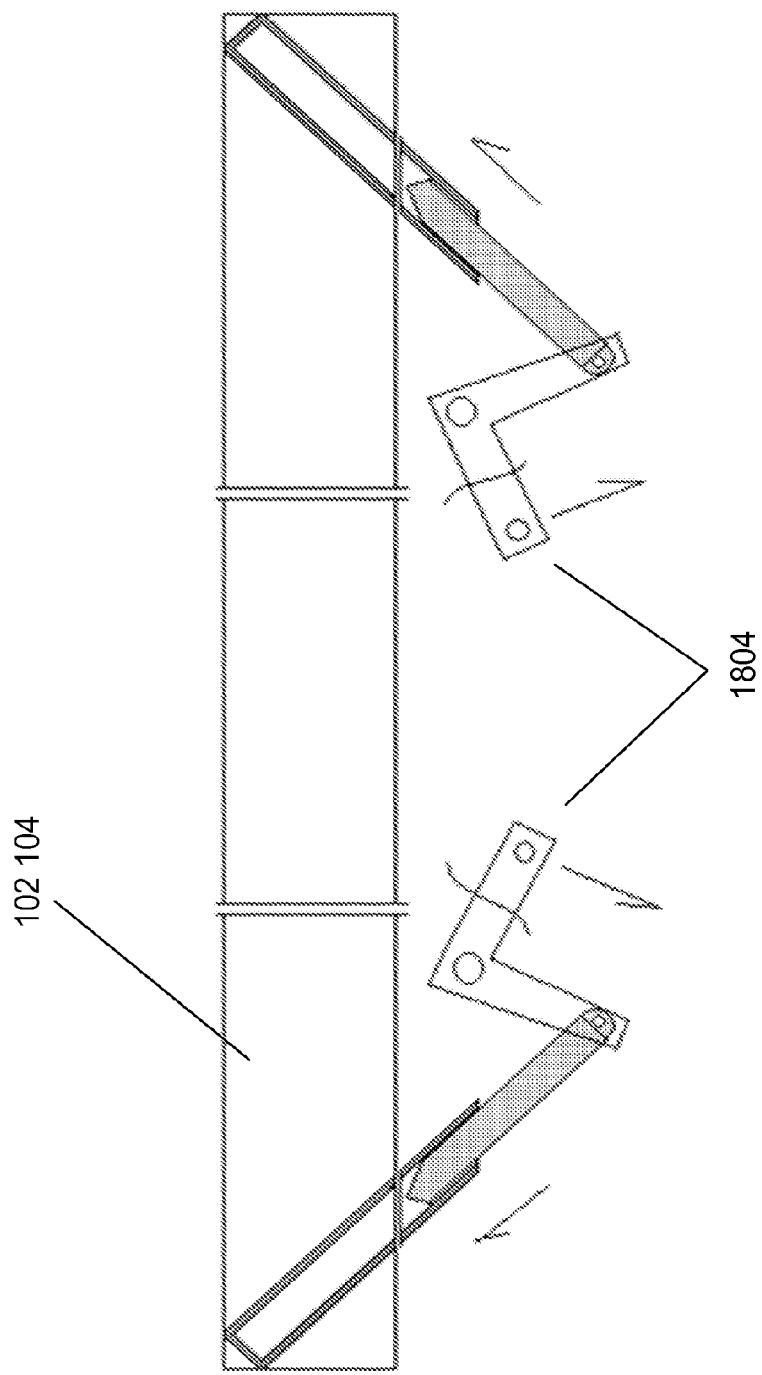
FIG. 22 depicts one embodiment of a set of locking pins.

A transport apparatus 100 can further comprise at least one set of locking pins 1804 adapted to secure lower and upper decks 102 104 together. FIG. 22 depicts one embodiment of a set of locking pins 1804, however in alternate embodiments locking pins 1804 can have any other known and/or convenient configuration.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A modular transport apparatus, comprising:
   a first deck having an upper surface and a lower surface;
   a second deck having an upper surface and a lower surface;
   said second deck being positioned over and substantially parallel to said top surface of said first deck;
   wherein said upper surface of said first deck and said lower surface of said second deck are operatively coupled via a deck lift assembly, such that said second deck can move vertically relative to said first deck;
   wherein said first deck is operatively coupled with a plurality of leg assemblies;
   wherein each of said plurality of leg assemblies is coupled with at least one drive assembly; and
   wherein each of said plurality of leg assemblies comprises at least one outrigger, at least one leg member, at least one leg collar, and at least one leg hydraulic mechanism.

2. A modular transport apparatus, comprising:
a first deck having an upper surface and a lower surface;
a second deck having an upper surface and a lower surface;
said second deck being positioned over and substantially parallel to said top surface of said first deck;
wherein said upper surface of said first deck and said lower surface of said second deck are operatively coupled via a deck lift assembly, such that said second deck can move vertically relative to said first deck;
wherein said first deck is operatively coupled with a plurality of leg assemblies;
wherein each of said plurality of leg assemblies is coupled with at least one drive assembly; and
wherein said deck lift assembly comprises a plurality of first arm members, a plurality of second arm members, at least one deck hydraulic mechanism, and at least one roller assembly.

3. The modular transport apparatus of claim 2, wherein said first and second decks each comprise at least one longitudinal channel adapted to slidably couple with said at least one roller assembly.

4. A modular transport apparatus, comprising:
a first deck having an upper surface and a lower surface;
a second deck having an upper surface and a lower surface;
said second deck being positioned over and substantially parallel to said top surface of said first deck;
wherein said upper surface of said first deck and said lower surface of said second deck are operatively coupled via a deck lift assembly, such that said second deck can move vertically relative to said first deck;
wherein said first deck is operatively coupled with a plurality of leg assemblies;
wherein each of said plurality of leg assemblies is coupled with at least one drive assembly; and
wherein at least one leg assembly is adapted to rotate.

5. A modular transport apparatus, comprising:
a first deck having an upper surface and a lower surface;
a second deck having an upper surface and a lower surface;
said second deck being positioned over and substantially parallel to said top surface of said first deck;
a hauler assembly positioned underneath and substantially parallel to said first and second decks;
wherein said upper surface of said first deck and said lower surface of said second deck are operatively coupled via a deck lift assembly, such that said second deck can move vertically relative to said first deck;
wherein said first deck is operatively coupled with a plurality of leg assemblies;
wherein each of said plurality of leg assemblies is coupled with at least one drive assembly.

6. A modular transport apparatus, comprising:
a first deck having an upper surface and a lower surface;
a second deck having an upper surface and a lower surface;
said second deck being positioned over and substantially parallel to said top surface of said first deck;
a leveling system adapted to detect and compensate for undesirable movement of said first and second decks;
wherein said upper surface of said first deck and said lower surface of said second deck are operatively coupled via a deck lift assembly, such that said second deck can move vertically relative to said first deck;
wherein said first deck is operatively coupled with a plurality of leg assemblies;
wherein each of said plurality of leg assemblies is coupled with at least one drive assembly.

7. The modular transport apparatus of claim 6, wherein said leveling system further comprises a plurality of torsion control sensors adapted to detect twisting motion of said first deck.

8. The modular transport apparatus of claim 7, wherein said leveling system further comprises the steps of:
utilizing an integral differential control adapted to collect feedback from said torsion control sensors;
transmitting said feedback to a central processing unit;
processing said feedback and sending processing results to a variable valve control interface;
wherein said variable valve control interface thereafter determines the desired positioning of the modular transport apparatus and instructs said at least one leg hydraulic to modify its position accordingly.

* * * * *